United States Patent
Da Silva et al.

(10) Patent No.: US 9,973,950 B2
(45) Date of Patent: May 15, 2018

(54) TECHNIQUE FOR DATA TRAFFIC ANALYSIS

(71) Applicant: Telefonaktiebolaget LM Ericsson (publ), Stockholm (SE)

(72) Inventors: Icaro L. J. Da Silva, Bromma (SE); Åsa Bertze, Spånga (SE); Jing Fu, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 184 days.

(21) Appl. No.: 15/031,091

(22) PCT Filed: Oct. 31, 2013

(86) PCT No.: PCT/EP2013/072753
§ 371 (c)(1),
(2) Date: Apr. 21, 2016

(87) PCT Pub. No.: WO2015/062652
PCT Pub. Date: May 7, 2015

(65) Prior Publication Data
US 2016/0286420 A1    Sep. 29, 2016

(51) Int. Cl.
*H04W 24/08*    (2009.01)
*H04L 29/08*    (2006.01)
(Continued)

(52) U.S. Cl.
CPC ........... *H04W 24/08* (2013.01); *G06Q 30/02* (2013.01); *H04L 61/103* (2013.01); *H04L 67/02* (2013.01);
(Continued)

(58) Field of Classification Search
CPC ............. H04W 24/08; G06F 17/30867; G06F 17/30864; G06Q 30/0256
See application file for complete search history.

(56) References Cited

U.S. PATENT DOCUMENTS 7,698,270 B2 * 4/2010 Brave ............... G06F 17/30867
707/603
8,131,271 B2    3/2012 Ramer et al.
(Continued)

FOREIGN PATENT DOCUMENTS

WO    WO 02/35421 A1    5/2002

OTHER PUBLICATIONS

International Search Report and Written Opinion of the International Searching Authority, Application No. PCT/EP2013/072753, dated Jun. 12, 2014.
(Continued)

*Primary Examiner* — Min Jung
(74) *Attorney, Agent, or Firm* — Sage Patent Group

(57) ABSTRACT

A technique for providing information derived from data traffic between a telecommunications network and the Internet is disclosed. The telecommunications network provides mobile Internet access to a plurality of mobile subscribers using IP addresses allocated to the mobile subscribers. Data packets in data traffic are analyzed at an interface between the telecommunications network and the Internet. Each analyzed data packet includes an IP address allocated to one of the plurality of mobile sub-scribers. For each of the analyzed data packets, a subscriber identity is retrieved based on the IP address included therein using an allocation function of the telecommunications network. The allocation function associates sub-scriber identities to IP addresses. Information derived from the analyzed data packets is stored in combination with the retrieved subscriber identities in a storing unit. An access interface for accessing the stored information is also provided.

22 Claims, 13 Drawing Sheets

(51) Int. Cl.
*H04L 29/12* (2006.01)
*G06Q 30/02* (2012.01)
*H04W 4/02* (2018.01)

(52) U.S. Cl.
CPC ............ *H04L 67/22* (2013.01); *H04L 67/306* (2013.01); *H04L 67/18* (2013.01); *H04W 4/02* (2013.01)

(56) References Cited

U.S. PATENT DOCUMENTS

| | | | | |
|---|---|---|---|---|
| 9,301,173 | B2* | 3/2016 | Papakostas | H04W 24/08 |
| 2001/0032258 | A1 | 10/2001 | Ishida et al. | |
| 2009/0138427 | A1 | 5/2009 | Kalavade | |
| 2009/0204610 | A1* | 8/2009 | Hellstrom | G06F 17/30 |
| 2010/0161785 | A1* | 6/2010 | Xue | G06F 17/30867 |
| | | | | 709/224 |
| 2013/0035985 | A1 | 2/2013 | Gilbert | |
| 2013/0067070 | A1* | 3/2013 | Rowe | G06Q 30/0201 |
| | | | | 709/224 |
| 2015/0051979 | A1* | 2/2015 | Knab | G06Q 30/0269 |
| | | | | 705/14.66 |
| 2017/0230256 | A1* | 8/2017 | Urbach | H04L 41/50 |

OTHER PUBLICATIONS

Chen et al., "Web Mining from Competitors' Websites", *KDD '05—Proceedings of the eleventh ACM SIGKDD international conference on Knowledge discovery in data mining*, Chicago, IL, Aug. 21-24, 2005, pp. 550-555.

Rafea, "Competitive Intelligence and Web Mining: Domain Specific Web Spiders" accessed Jun. 11, 2013 from http://www.cse.aucegypt.edu/~rafea/CSCE590/Fall08/Salama/Competitive_Intelligence_and_Web_Mining.pdf, 11 pp.

Srivastava et al., "Web Mining—Concepts, Applications & Research Directions", Chapter 3 in *Foundations and Advances in Data Mining (Studies in Fuzziness and Soft Computing)*, Springer-Verlag Berlin Heidelberg, Oct. 26, 2005, 21 pp.

\* cited by examiner

TECHNIQUE FOR DATA TRAFFIC ANALYSIS

CROSS REFERENCE TO RELATED APPLICATION

This application is a 35 U.S.C. § 371 national stage application of PCT International Application No. PCT/EP2013/072753, filed on Oct. 31, 2013, the disclosure and content of which is incorporated by reference herein in its entirety. The above-referenced PCT International Application was published in the English language as International Publication No. WO 2015/062652 A1 on May 7, 2015.

TECHNICAL FIELD

The present disclosure generally relates to a technique for providing information derived from data traffic. More specifically, and without limitation, the disclosure relates to a method and a device for analyzing mobile Internet usage based on data traffic between a telecommunications network and the Internet.

BACKGROUND

A primary purpose of the Internet is the distribution of information, e.g., by means of web pages collectively referred to as the web. Almost every company provides web pages for informing business partners or consumers about products or services. Conversely, companies and consumers use the Internet, and more specifically search engines, for identifying suppliers and merchandises as part of electronic commerce.

In addition to a static analysis of web content and web structure, which is known as web content mining and web structure mining, a dynamic analysis of user interaction with web pages is known as web usage mining and reveals whether or not the provided content and structure is aligned to user interests. Web mining techniques are described in "Web Mining-Concepts, Applications and Research Directions", by J. Srivastava et al., Chapter 3 in Foundations and Advances in Data Mining, Studies in Fuzziness and Soft Computing, volume 180, 2005, pp. 275 to 307.

The insight gained by web usage mining allows optimizing structure and content of web services. For example, the dynamic view of web usage allows a company to assess its own web pages. Web usage mining further allows comparing web services that compete for identical users, and thus contributes to studies known as Competitive Intelligence (CI).

"Web Mining from Competitors' Websites", by X. Chin et al., KDD 2005, Proceedings of the 11th ACM SIGKDD International Conference on Knowledge Discovery in Data Mining, pp. 550 to 555, describes a technique for discovering patterns in web re-sources to identify a collection of web pages, objects or resources that are frequently accessed by groups of users with common needs or interests.

Conventionally, companies obtain data representing the web usage of their own website from log files of a web server delivering web pages of the website in response to HTTP requests. In this context, FIG. 1 shows an excerpt 100 of a typical web server log file containing information about each HTTP request 102 to 112 received by the web server.

Depending on the goals of the web usage mining analysis, the log file data is processed or aggregated at different levels. On a first level, a pageview is defined by a set of web objects requested for a user-specific event, such as reading an article, viewing a product or adding a product to a list stored on a server for electronic commerce. For a higher level of aggregation, a session is defined by a sequence of pageviews of a single user during a single visit of the website.

It is important for the analysis to be able to follow the same user over time. However, it is difficult to identify the users based on the web server log files. Internet Protocol (IP) addresses, from which the HTTP requests of a single user originate, are repeatedly changed by an Internet Service Provider (ISP), e.g., when the ISP uses a Dynamic Host Configuration Protocol (DHCP). The user may thus access the website with a different IP address each time, complicating the identification of the same user over time. Partial solutions for identifying the user include, e.g., browser cookies, but not all users allow cookies in the web browser, which makes the solution unreliable in some cases and may cause a bias in the analysis.

Another conventional approach collects data directly from networks of ISPs for web usage mining. For example, the service "Experian Hitwise" aggregates data on user behavior to measure website market share. While the data from ISP networks allows observing clickstreams and user interaction with web resources, a correlation between different HTTP requests associated with a single user may still be difficult or even impossible in certain situations, e.g., since one specific landline Internet access is typically used by a plurality of different persons at the same time.

SUMMARY

Accordingly, there is a need for a technique that provides data for a more reliable and/or more accurate web usage analysis.

According to one aspect, a method of providing information derived from data traffic between a telecommunications network and the Internet is provided. The telecommunications network provides mobile Internet access to a plurality of mobile subscribers using Internet Protocol (IP) addresses allocated to the mobile subscribers. The method comprises the steps of analyzing, in data traffic at an interface between the telecommunications network and the Internet, data packets each of which including an IP address; the step of retrieving, for the analyzed data packets, a subscriber identity based on the IP address included in a data packet using an allocation function of the telecommunications network, the allocation function associating subscriber identities to IP addresses; the step of storing information derived from the analyzed data packets in combination with the retrieved subscriber identities; and the step of providing an access interface for accessing the stored information.

The access interface may be accessible via the Internet. The access interface may include a web interface and/or an Application Programing Interface (API).

The derived information may be stored in further combination with information as to a current location of the mobile subscriber. The telecommunication network may be structured in cells. The location information may be determined by the telecommunications network based on the cell to which the mobile subscriber is wirelessly coupled. Alternatively or in addition, the location information may be determined by multilateration of radio signals between base stations of the telecommunications network. Alternatively or in addition, the location information may include Global Position System, GPS, data received from the mobile subscriber.

The information derived for each of the analyzed data packets may include a Uniform Resource Locator, URL, for the Internet. The method may further comprise the step of computing correlations for combinations of two or more different URLs. Each correlation may be computed for one of the combinations based on a first number of subscriber identities. Each of the subscriber identities stored in combination with each of the two or more URLs of the one combination may contribute to the first number.

Each correlation may be normalized by a second number of subscriber identities. Each of the subscriber identities stored in combination with at least one of the two or more URLs of the corresponding combination contributes to the second number. Alternatively or in addition to the normalized correlation, a joined probability for a subscriber visiting each of the two or more URLs may be computed.

The method may further comprise the step of computing transition probabilities for pairs of first and second URLs. Each transition probability may be computed for a transition from the first URL to the second URL of one of the pairs based on a third number of subscriber identities divided by a fourth number of subscriber identities. Each of the subscriber identities stored at least once in combination with the first URL of the one pair and at least once in combination with the second URL of the one pair may contribute to the third number. Each of the subscriber identities stored at least once in combination with the first URL of the one pair may contribute to the fourth number.

The method may further comprise the step of receiving a descriptor for specifying a set of URLs via the API. At least one of the correlations and transition probabilities may be computed for the set of URLs specified by the descriptor and provided via the API.

The descriptor may include at least one of a list of URLs, one or more keywords for identifying URLs based on content that is referenced by the URLs and includes the keywords, and one or more categories for identifying URLs based on content that is referenced by the URLs and subsumed by the categories.

Data packets originating from an Internet source and directed towards the telecommunications network may be analyzed. The method may further comprise the step of storing the URL in association with the Internet source in a potential referral data-base. The term database, as used herein, may encompass tables and/or distributed file systems.

The analyzed data packets may represent a search result. The Internet source may be a search engine. The stored URL may correspond to a potential referrer, e.g., a link presented at the mobile subscriber. The absence of a subsequent data packet including an HTTP request for the URL of the potential referrer may be counted as a dismissal of the URL.

Data packets directed towards the Internet and including a Hypertext Transfer Protocol (HTTP) request may be analyzed. The HTTP request may include or indicate the URL. The URL may be stored in association with the subscriber identity in a subscriber-URL database, entries in the subscriber-URL database including one subscriber identity and one URL. Each entry in the subscriber-URL database may include one subscriber identity and one URL. Each entry may represent one link selection event. Entries in the subscriber-URL database may further include a time stamp indicative of at least one of a time of submitting the HTTP request at the mobile subscriber and a time of analyzing the data packet at the interface. Each entry in the subscriber-URL database may include the time stamp.

The subscriber-URL database may include the time stamp for each combination of subscriber identity and URL. The HTTP request may be submitted by the HTTP method GET.

Each entry in the subscriber-URL database may further include an HTTP response status, a client application submitting the HTTP request, an operating system executing the client application, a number of bytes (e.g., for user data) received and/or transmitted, e.g., by means of the analyzed data packet or the referenced content. The HTTP response status may be obtained from an HTTP response related to the HTTP request and including an HTTP response status code. The client used by the mobile subscriber may be obtained from a header of the HTTP request, e.g., a User-Agent header field.

The subscriber identity may be stored in association with the URL in a URL-subscriber database. Some or each of the entries in the URL-subscriber database may include one URL and at least one subscriber identity. The entries in the URL-subscriber data-base may be subdivided into consecutive time intervals, each of the entries corresponding to one time interval of the consecutive time intervals.

Each entry may include the at least one subscriber identity submitting the HTTP request for the corresponding one URL in the one time interval of the consecutive time intervals. The correlations for combinations of URLs may be computed based on the URL-subscriber database. The correlation may be computed separately for one or all of the consecutive time intervals.

The method may further comprise the steps of obtaining content referenced by the URL; and storing information derived from the obtained content in association with the URL in a URL-content database. The step of obtaining may be triggered by a change in the URL-subscriber database. The step of obtaining may be performed for each of a plurality of entries in the URL-subscriber database.

The content may be obtained from the Internet in a HTTP response to a second HTTP request, which is different from the HTTP request included in the analyzed data packet.

The method may further comprise the step of caching content in an HTTP response in the data traffic at the interface from the Internet towards the telecommunications network in a cache in association with the URL included in the HTTP request of the analyzed data packet. The HTTP response may be related to the HTTP request by the URL or a session ID further included in the HTTP request and the HTTP response. The content referenced by the URL in the URL-subscriber database may be obtained from the cache.

Entries in the URL-subscriber database may further include a counter indicative of a number of the analyzed data packets including the corresponding URL. The step of obtaining the content may be triggered for a plurality of entries in the URL-subscriber database in an order defined by the counter. Each entry in the URL-subscriber data-base may include the counter.

The counter may represent multiple visits of at least one of the associated mobile subscribers. Each entry may be indicative of the subscriber identities without multiplicity. Consequently, the counter may be equal to or greater than a number of subscriber identities for each entry.

The content may be obtained from an HTTP response in the data traffic at the inter-face towards the telecommunications network. The HTTP response may be related to the HTTP request by the URL or a session ID further included in the HTTP request and the HTTP response.

The method may further comprise the step of extracting keywords from the content. A category may be determined in a predefined taxonomy (e.g., a hierarchical taxonomy) based on the content (or based on the extracted keywords). The derived information may include the determined category and/or the keywords stored in association with the URL in the URL-content database.

The method further comprising receiving, via the API, one or more categories. The method may further comprise generating a set of URLs that are stored in the URL-content table in association with at least one of the one or more categories.

The method may further comprise the step of storing the URL in a referral database in association with an HTTP referrer, if the HTTP request further includes the HTTP referrer in a header field of the analyzed data packet. Otherwise the URL may be stored in the referral database in association with an indicator indicating the absence of the HTTP referrer. The URL may be counted as a direct access in the absence of the HTTP referrer. Each entry in the referral database may include the URL in association with the HTTP referrer or the indicator and/or may further include a counter, which is incremented for each analyzed data packet corresponding to the association.

The analyzed data packets may be forwarded at the interface between the telecommunications network and the Internet without modifying the analyzed data packets. The analyzing unit may include a passive probe and/or may transparently forward the analyzed data packets.

The subscriber identity may uniquely identify the mobile subscriber at least within the telecommunications network.

The mobile subscribers may send and/or receive data traffic from different locations. E.g., the mobile subscribers may place calls to areas and/or receive calls from areas. The derived information may be stored further in combination with the locations (e.g., the areas of calls) of the subscriber identity. The location (e.g., the area) may be defined by geographical coordinates. The areas may be defined by telephone numbers. The areas may be defined by area codes.

The method may further comprise identifying types of User Equipment (UE) used by the mobile subscribers for accessing the telecommunications network. The derived information may be stored in further combination with the type of UE of the subscriber identity.

The subscriber identity may includes an International Mobile Subscriber Identity (IMSI). The IP address allocated to the mobile subscriber may be unique within Internet. The IP address may be dynamically allocated to the mobile subscriber, e.g., responsive to a first Internet access. The IP address may be deallocated, e.g., when the mobile subscriber is disconnected from the telecommunications network.

The subscriber identity may include a hash value derived from personally identifiable information. The personally identifiable information may not be included and/or not derivable from the subscriber identity. Each of the hash values or each of a majority of the hash values may be allocated to exclusively one of the mobile subscribers. The personally identifiable information may include at least one of the IMSI, a telephone number, a name and an address.

The telecommunications network may include a Radio Access Network (RAN) providing the mobile Internet access and/or a Core Network (CN), which is connected to the RAN and the Internet.

According to another aspect, a computer program product is provided, which comprises program code portions for performing any one of the steps of the method aspect when the computer program product is executed by a computing device. Furthermore, the computer program product may be stored on a computer-readable recording medium.

As to a hardware aspect, a device for providing information derived from data traffic between a telecommunications network and the Internet is provided. The telecommunications network provides mobile Internet access to a plurality of mobile subscribers using Internet Protocol (IP) addresses allocated to the mobile subscribers. The device comprises an analyzing unit adapted to analyze, in data traffic at an inter-face between the telecommunications network and the Internet, data packets each of which including an IP address; a retrieving unit adapted to retrieve, for the analyzed data packets, a subscriber identity based on the IP address included in a data packet using an allocation function of the telecommunications network, the allocation function associating subscriber identities to IP addresses; a storing unit adapted to store information derived from the analyzed data packets in combination with the retrieved subscriber identities; and a providing unit adapted to provide an access interface for accessing the stored information.

The information derived for each of the analyzed data packets may include a Uniform Resource Locator (URL) for the Internet. The device may further comprise a computing unit adapted to compute transition probabilities for pairs of first and second URLs, each transition probability being computed for a transition from the first URL to the second URL of one of the pairs based on a third number of subscriber identities divided by a fourth number of subscriber identities, wherein each of the subscriber identities stored at least once in combination with the first URL of the one pair and at least once in combination with the second URL of the one pair contributes to the third number, and wherein each of the subscriber identities stored at least once in combination with the first URL of the one pair contributes to the fourth number.

The device may further include any one of the features disclosed in the context of the method aspect and/or may be adapted to perform any one of the steps disclosed in the context of the method aspect.

BRIEF DESCRIPTION OF THE DRAWINGS

Further features, effects and advantages of the technique are described in more detail below, for the purpose of explanation and not limitation, with reference to the drawings, wherein.

DETAILED DESCRIPTION

In the following description of exemplary embodiments, specific details are set forth for purposes of explanation, such as particular configurations, sequences of steps and data representations, in order to provide a thorough understanding of the present disclosure. It is apparent to one skilled in the art that the technique presented herein may be practiced in other embodiments that depart from these specific details. For example, while the embodiments are primarily described in the context of the LTE mobile telecommunications standard, the skilled person readily implements the technique presented herein in connection with other generations of telecommunications systems, for example, the UMTS and the GSM standards.

Moreover, those skilled in the art will appreciate that components, units, services, functions and steps explained herein below can be implemented using software functioning in conjunction with a programmed microprocessor, an Application Specific Integrated Circuit (ASIC), a Digital Signal Processor (DSP) or a general purpose computer. It will also be appreciated that while the following embodiments are primarily described in the context of methods and devices, the present disclosure may also be embodied in a computer program product as well as in a system comprising a processor and a memory coupled to the processor, wherein the memory is encoded with one or more programs that are configured to perform the components, units, services, functions and steps disclosed herein.

Figure 2:
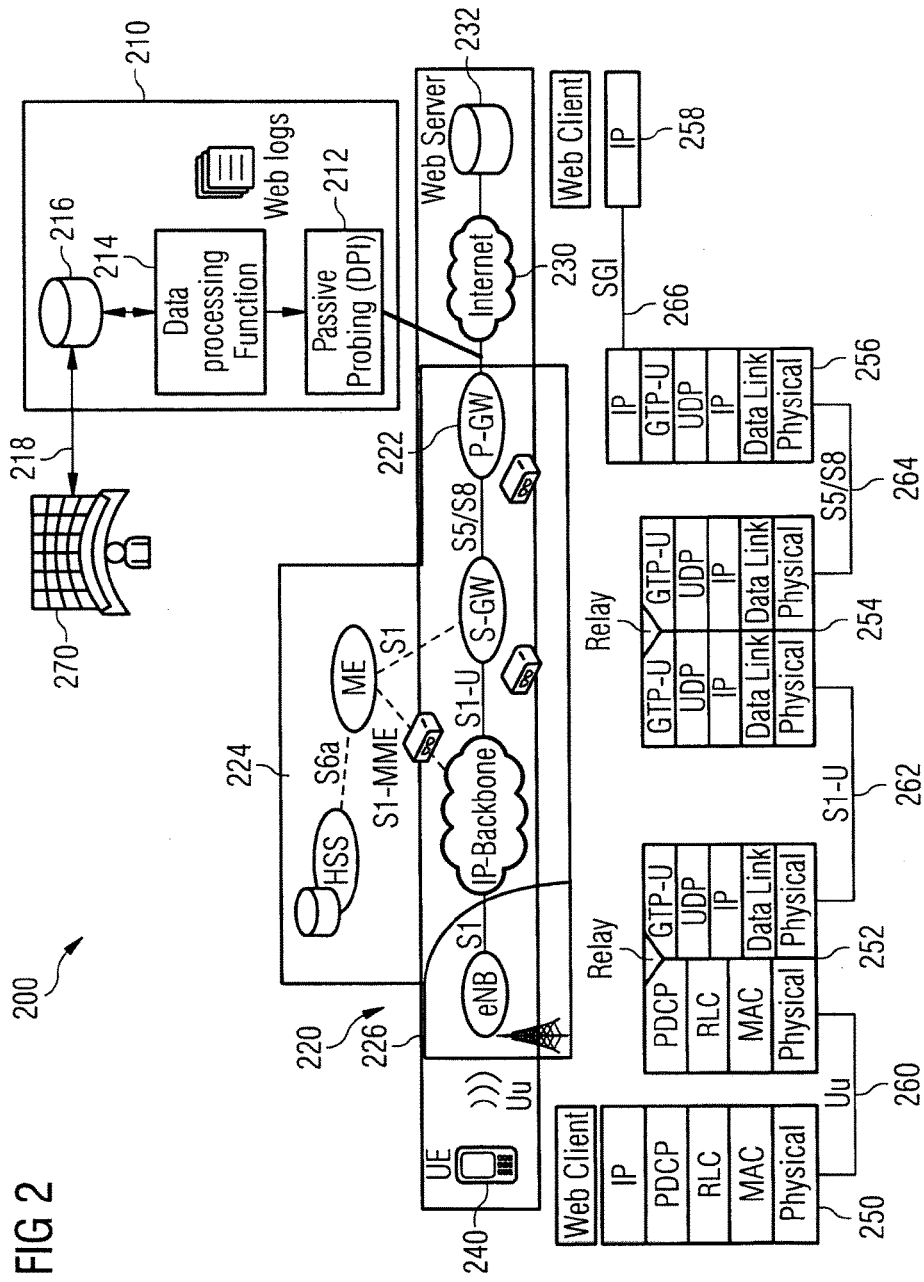
FIG. 2 schematically illustrates a network environment including an embodiment of a device for providing information derived from data traffic.

FIG. 2 schematically illustrates a network environment 200 including an embodiment of a device 210 for providing information derived from data traffic between a telecommunications network 220 and the Internet 230. The telecommunications network 220 provides mobile Internet access to a plurality of mobile subscribers 240. The mobile subscribers 240 use an Internet Protocol (IP) address that is allocated to the mobile subscribers 240 by the telecommunications network 220. Each mobile subscriber has a subscriber identity. An allocation function of the telecommunications network 220 allocates to each mobile subscriber 240 using the Internet access an IP address.

The device 210 for providing data traffic-related information comprises an analyzing unit 212 adapted to analyze data packets in data traffic at an interface 222 between the telecommunications network 220 and the Internet 230. Each of the data packets indicates the IP address previously allocated to one of the plurality of mobile subscribers 240. The device 210 further comprises a retrieving unit 214 adapted to retrieve, for each of the analyzed data packets, the subscriber identity of the underlying mobile subscriber 240 based on the IP address included therein using the allocation function of the telecommunications networks 220. In a storing unit 216 of the device 210, information derived from the analyzed data packets is stored in combination with the retrieved subscriber identities. The device 210 further comprises a providing unit 218 adapted to provide an access interface for accessing the derived information.

In the embodiment shown in FIG. 2, the analyzing unit 212 is implemented by a passive probe, e.g., at an SGi interface 266 towards an IP Public Data Network (PDN) such as the Internet 230. The data traffic between a server 232 in the Internet 230 and a client application at the mobile subscriber 240 passes through the SGi interface 266. The analyzing unit 212 extracts the same type of data that is stored in web server log files 100 or reported by browser clients. However, the extracted data is not limited to a communication including a certain server 232 or a certain client.

The exemplary telecommunications network 220 shown in FIG. 2 includes a Core Network (CN) 224 and a Radio Access Network (RAN) 226. The bottom of FIG. 2 indicates protocol stacks 250, 252, 254, 256 and 258 of the mobile subscriber 240, the telecommunications network 220 and the Internet 230 as well as interfaces 260, 262, 264 and 266 provided by the nodes of the telecommunications network 220.

The exemplary environment shown in FIG. 2 includes a Long Term Evolution (LTE) telecommunications network 220. The CN 224 provides a System Architecture Evolution (SAE) including an Evolved Packet Core (EPC). The RAN 226 provides evolved UMTS Terrestrial Radio Access (e-UTRA) to User Equipments (UEs) of the mobile subscribers 240. The technique is not limited to the mobile network scenario illustrated in FIG. 2. For example, the technique is applicable to any telecommunications network providing an interface at which HTTP traffic can be analyzed by a passive probe 212.

Figure 3:
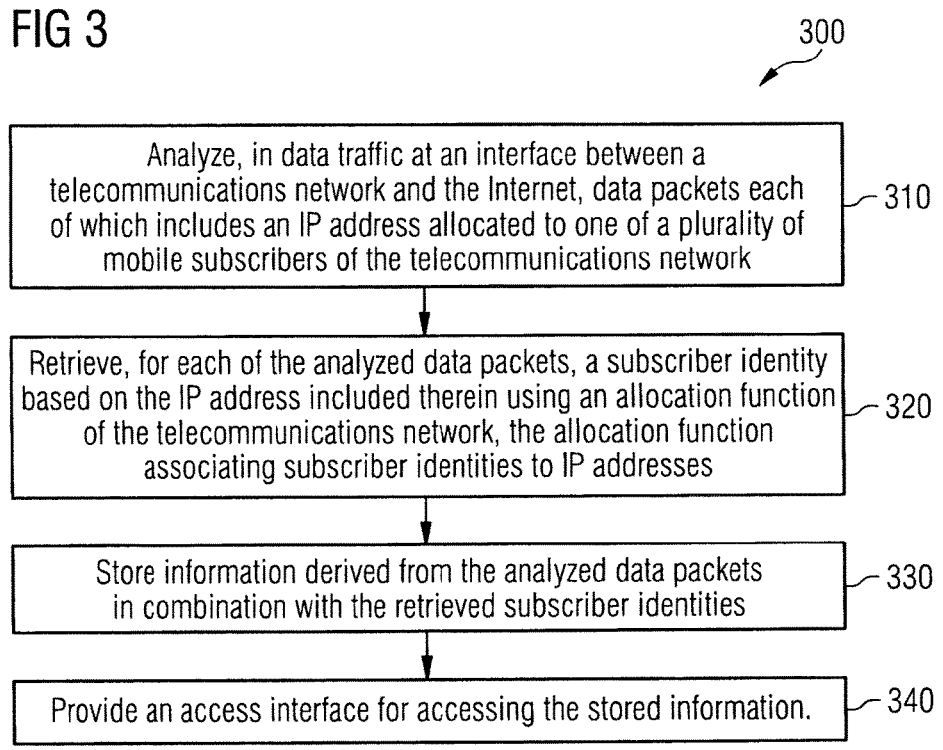
FIG. 3 shows a flowchart of a method embodiment for operating the device of FIG. 2.

FIG. 3 shows a flowchart for implementing a method 300 of providing information derived from data traffic between a telecommunications network and the Internet.

The telecommunications network provides mobile Internet access to a plurality of mobile subscribers using Internet Protocol (IP) addresses allocated to the mobile subscribers.

The method 300 comprises a step 310 of analyzing data packets in the data traffic at an interface between the telecommunications network and the Internet. Each of the analyzed packets includes an IP address allocated to one of the plurality of mobile subscribers of the telecommunications network.

In a step 320 of the method 300, a subscriber identity is retrieved for each of the analyzing data packets based on the IP address included therein using an allocation function of the telecommunications network. The IP address may be read from a source IP address field or a destination IP address field of the data packet. The allocation function associates subscriber identities to IP addresses.

Information derived from the analyzed data packets is stored in combination with the retrieved subscriber identities in a step 330 of the method 300. An access interface for accessing the stored information is provided in the step 340 of the method 300.

The method 300 can be performed in the network environment 200. For example, the steps 310, 320, 330 and 340 are performed by the units 212, 214, 216 and 218, respectively.

An implementation of the device 210 and the method 300 exposes the stored data at the access interface 218 through an Application Programming Interface (API). The stored data can be used for Competitive Intelligence (CI) studies based on web usage mining analyzed, e.g., by the unit 212 of all web traffic passing through the interface 222 of the mobile telecommunications network 220.

Further details of modules, functions and components implementable in the analyzing unit 212, the retrieving unit 214 and/or the providing unit 218, and performed in the steps 310, 320 and/or 340, for the derivation of the information are described below.

Figure 4:
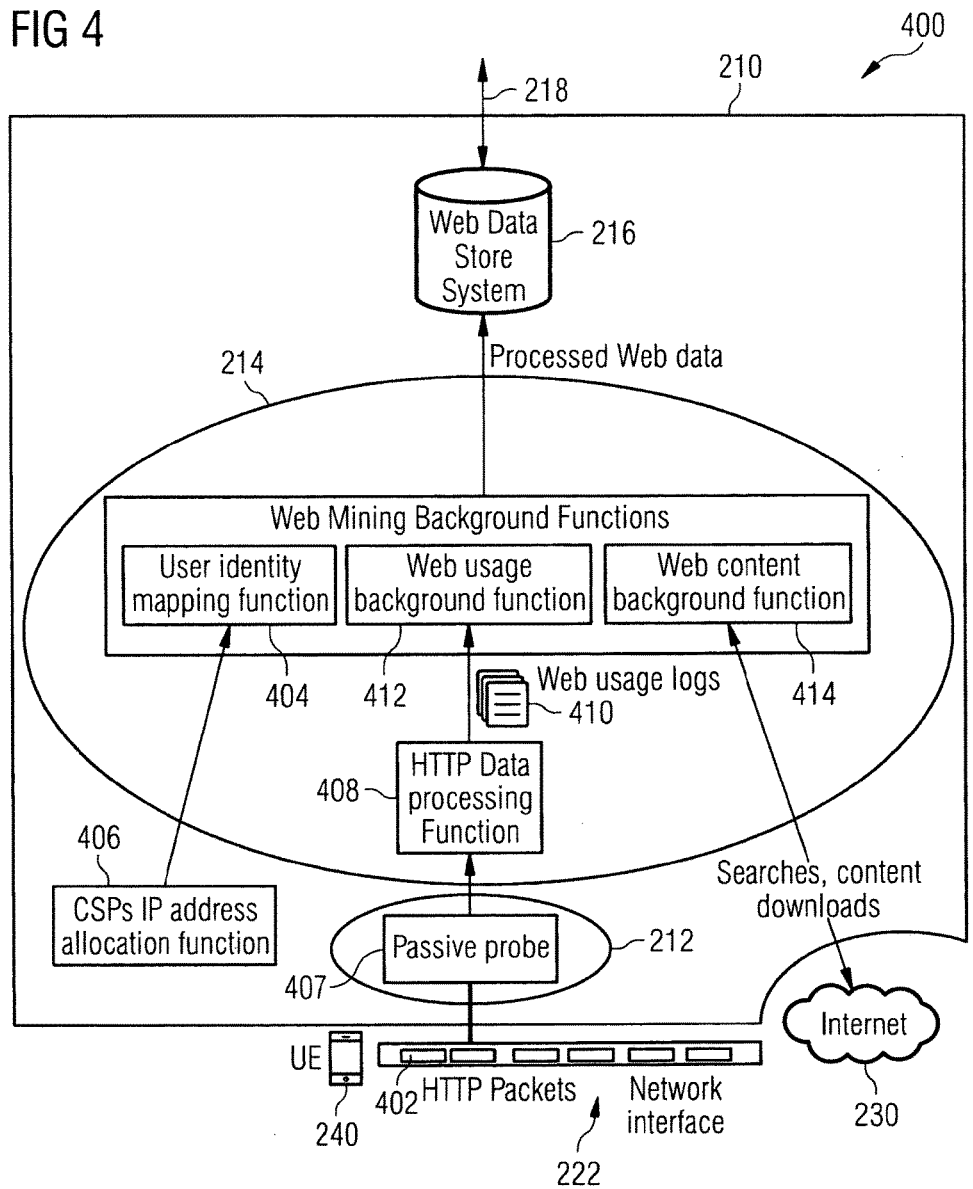
FIG. 4 schematically illustrates details of a first implementation of the device of FIG. 2.

FIG. 4 shows a block diagram 400 schematically illustrating one of the mobile subscribers 240 accessing the Internet 230 via the interface 222. The data traffic at the interface 222 includes a plurality of data packets 402, some of which include HTTP requests or HTTP responses collectively referred to as HTTP data packets.

The implementation of the retrieving unit 214 shown in FIG. 4 includes a function 404 for retrieving the subscriber identity. The retrieving function 404 accesses the allocation function, shown at reference sign 406, of the telecommunications network 220. The passive probe 407, shown at reference sign 407, is inserted at the network interface 222, through which the HTTP traffic including the HTTP data packets 402 passes. A reduced implementation of the analyzing unit 212 only includes the passive probe 407.

Figure 1:
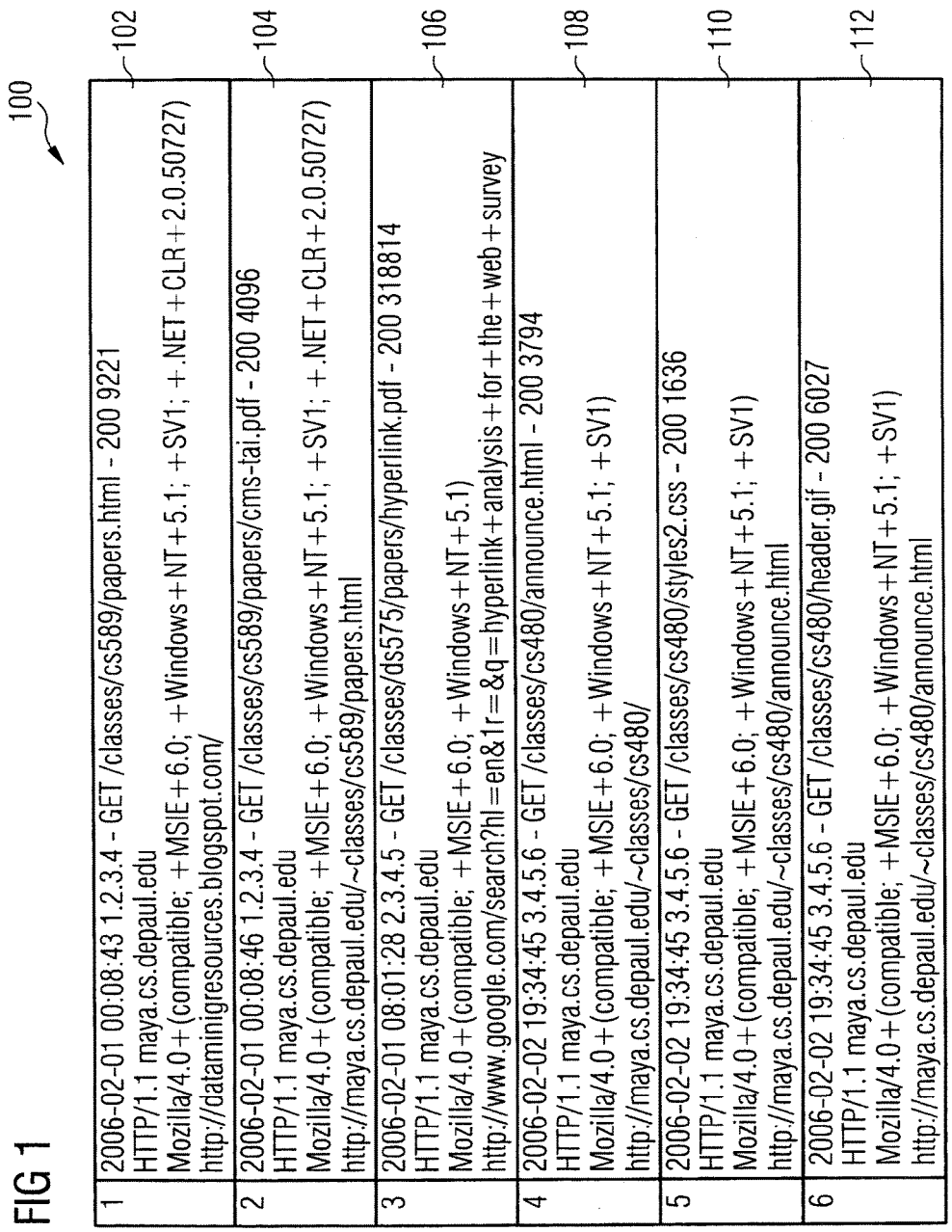
FIG. 1 shows an exemplary excerpt of a log file indicative of HTTP requests.

For providing information based on web usage, the HTTP packets 402 are processed in a HTTP data processing function 408 adapted to extract, from the HTTP packets 402 provided by the passive probe 407, field values of the HTTP requests and/or the HTTP responses. The values extracted by the HTTP data processing function 408 can be structured similarly to the log files shown in FIG. 1. The values extracted by the HTTP data processing function 408 are stored in web usage log files 410.

In an alternative implementation of the device 210, the web usage log files 410 are accessible via the access interface 218. For storage efficiency, the web usage log files 410 are stored in a dedicated directory of the storing unit 216.

In the implementation shown in FIG. 4, the web usage log files 410 are not directly accessible via the access interface 218 for improved data security. The web usage log files 410 are exclusively accessible to modules and functions in the analyzing unit 212 and/or the retrieving unit 214.

The implementation of the retrieving unit 214 shown in FIG. 4 further includes a web usage background function 412. The web usage background function 412 receives the subscriber identity for a certain HTTP data packet 402 or a group of HTTP data packets 402 from the retrieving function 404. The web usage background function 412 statistically analyzes the web usage based on the HTTP fields extracted by the passive probe 212 in conjunction with the subscriber identities provided by the retrieving function 404. The extended implementation of the retrieving unit 214 shown in FIG. 4 further includes a web content background function 414 accessing the Internet 230 for retrieving web content that is referenced in the HTTP data packets 402. Results of at least the web usage background function 412 are stored in the storing unit 216 of the device 210.

An exemplary implementation of the web usage background function 412 and the web content background function 414 is described with reference to FIGS. 5 and 6, respectively. The web usage background function 412 and the web content background function 414 are collectively referred to as web mining background functions. The web mining background functions run all the time for generating supporting data structures. An extended implementation of the analyzing unit 212 includes the web mining background functions. A reduced implementation of the retrieving unit 214 only includes the retrieving function 404.

Figure 5:
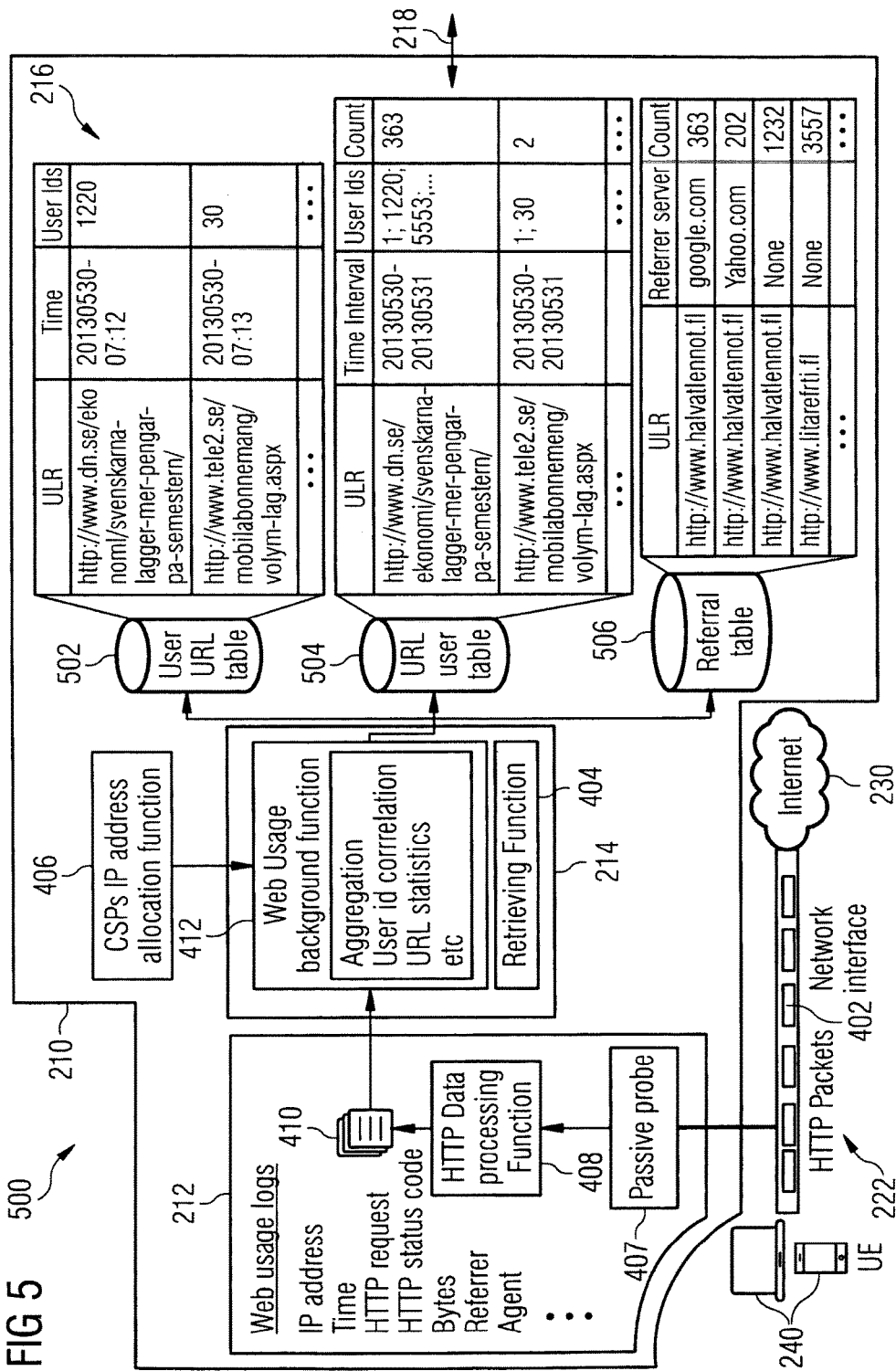
FIG. 5 schematically illustrates details of a second implementation of the device of FIG. 2 combinable with the implementation of FIG. 4.

FIG. 5 schematically illustrates a block diagram 500 including another implementation of the device 210 including the web usage background function 412. The web usage background function 412 collects, processes and stores information related to web usage. For example, the web usage is stored for later analysis by a Competitive Intelligence Module (CIM).

The analyzing unit 212 (e.g., as is shown in FIG. 5) or the retrieving unit 214 (e.g., as is shown in FIG. 4) include the HTTP data processing function 408, which takes as input the packet traces 402 from the passive probe 407 and aggregates the packet traces into web usage log files 410. The web usage log files 410 are structured similarly to the log files 100, e.g., of a web server such as an Apache web access log file.

The web usage background function 412 is included in the retrieving unit 214 in the implementation of the device 210 shown in FIG. 5. In a variant, the web usage background function 412 is included in the analyzing unit 212. The web usage background function 412 accesses the web usage log files 410 for further processing and storing in the storing unit 216.

The implementation of the device 210 shown in FIG. 5 includes three databases 502, 504 and 506 for storing, in the storing unit 216, different data structures generated by the web usage background function 412. Any sub-combination including one or two of the databases 502 to 506 can be implemented. The retrieving function 408 collects information from the allocation function 406 of the telecommunications network 220 in order to replace the changing IP address with a subscriber identity that is static over time, e.g., an International Mobile Subscriber Identity (IMSI) used by the mobile telecommunications network 220.

The subscriber URL database 502 includes an entry for each HTTP request extracted by the analyzing unit 212 from the stream of data packets 402. The entry in the subscriber URL table 502 includes the URL to which the HTTP request in the HTTP data packet 402 refers, a time stamp and the subscriber identity retrieved by the retrieving function 404 in the retrieving unit 214. In the implementation shown in FIG. 5, the first line of the time stamp includes the date of the HTTP request and the second line includes the time of the HTTP request.

The URL subscriber database 504 is derived from the subscriber URL database 502 by collecting all HTTP requests including the same URL in a certain time interval, e.g., one day. In the data structure implemented in the embodiment shown in FIG. 5, the URL is included in the first column, the time interval is included in the second column, the subscriber identity is included in the third column and the number of HTTP requests accessing the URL is indicated in the fourth column. The multiplicity represented by the fourth column can be larger than the number of different subscriber identities in the third column, e.g., if the same user accesses the same URL more than once in the time interval.

Figure 6:
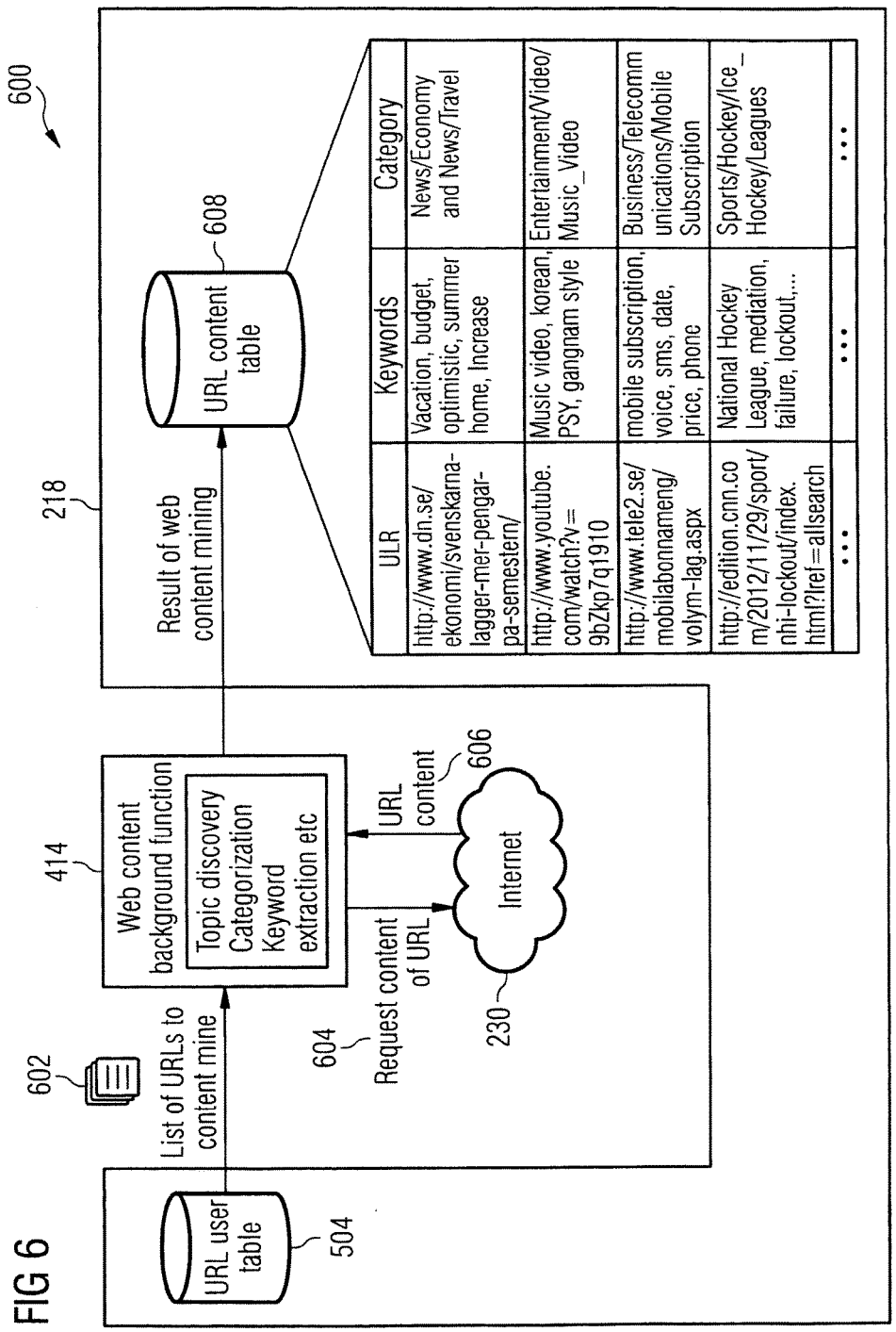
FIG. 6 schematically illustrates details of a third implementation of the device of FIG. 2 combinable with the implementations of FIGS. 4 and 5.

A block diagram 600 for an implementation of the web content background function 414 is shown in FIG. 6. The web content background function 414 analyzes and stores information about the content of web pages that are visited by the subscribers 240 in the telecommunications network 220. The device 210 considers each HTTP request as one of the visits. In an advanced implementation, the analyzing unit 212 or the retrieving unit 214 stores session identifiers so that all HTTP requests relating to the same session identifier are considered as one visit.

Data in the URL subscriber database 504 is input to the web content background function 414. In the implementation shown in FIG. 6, the web content function 414 receives a list 602 of URLs that have been accessed by the subscribers 240 in the telecommunications network 220. The list 602 is sorted, e.g., according to the total number of visits per URL (e.g., the forth column of the URL subscriber table 504 in the implementation shown in FIG. 5). Hence, the most visited URLs is prioritized for the analysis by the web content background function 414, e.g., in case of limited processing resources.

For each URL to be analyzed, the web content background function 414 performs a request for the content of the URL, as is indicated at reference sign 604. The request 604 is the same type of HTTP request a browser at the mobile subscriber 240 sends for the web pages at the URL). The web content background function 414 receives the content of that URL in response 606 to the request 604.

In an alternative implementation of the web content background function 414, the passive probe 407 also stores the content of the web pages in addition to the mobile subscribers 240 sending the HTTP request from the telecommunications network 220 towards the Internet 230 and receiving the HTTP response from the Internet 230. In this case, the request 604 is directed towards an internal database storing the content fetched by the passive probe 407 (instead of the request 604 directed towards the Internet 230, as is shown in FIG. 6). The alternative implementation has the advantage of successfully retrieving the web content of temporary web content (e.g., news streams) or other URL that have expired at the time of the request 604.

The web content background function 414 performs Natural Language Processing (NLP) for determining a topic and/or categorization of the received URL content 606. For this or in addition, keywords are extracted from the URL content 606.

The result of the web content mining is stored in the URL content database 608.

In an exemplary data structure of the URL content database 608, for each web page URL, key words are extracted and the web page is classified into a predefined taxonomy, i.e., a hierarchy of categories. The keywords are optionally used for the categorization. The URL content database 608 stores the category for each URL, as is exemplified in FIG. 6. Each line in the exemplary table of the URL content database 608 represents one entry. In an advanced embodiment, the web content background function 414 uses the extracted keywords for traversing the taxonomy, wherein a predefined fraction of the keywords have to subsume the category defining the depth in the hierarchical taxonomy.

Figure 7:
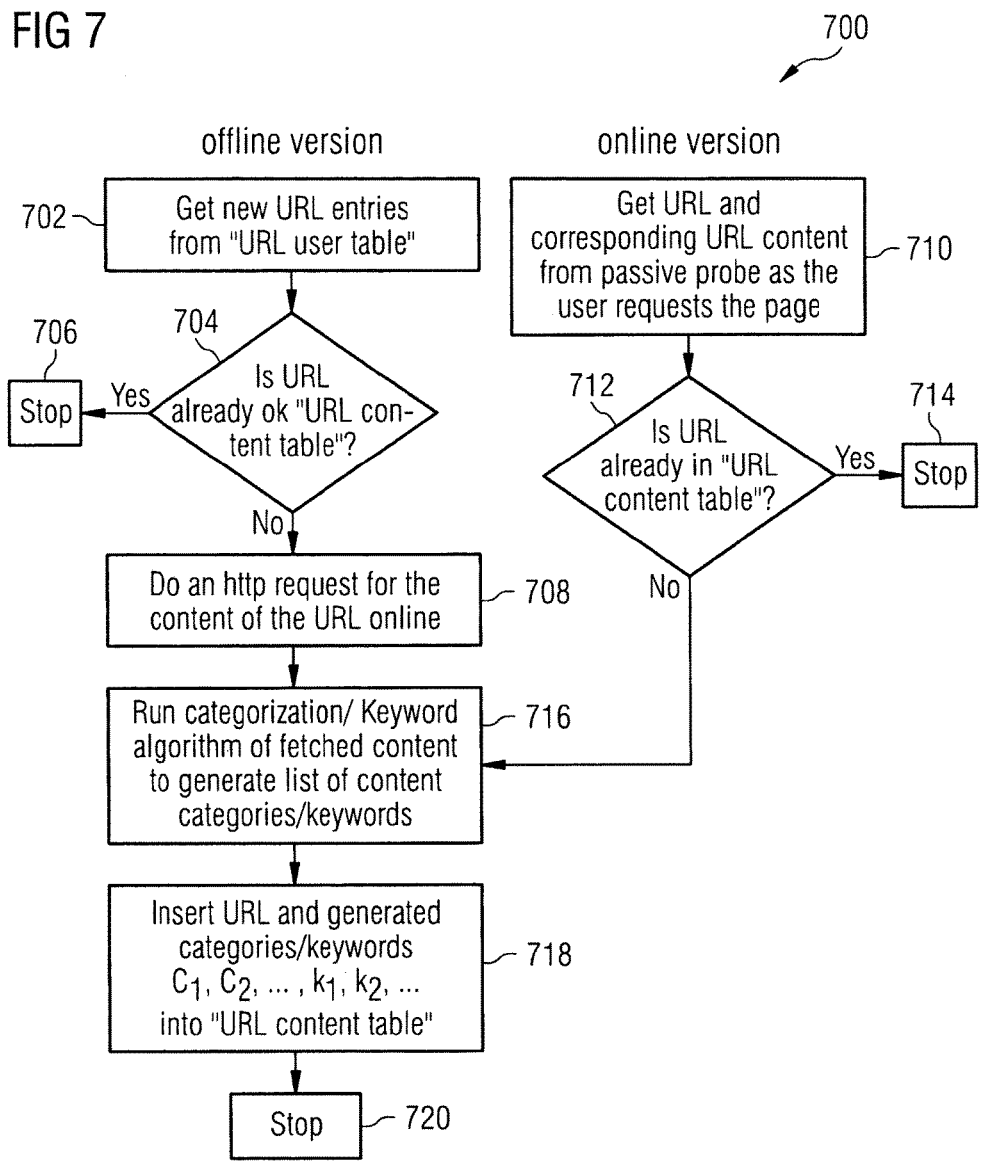
FIG. 7 shows a flowchart for operating the third implementation of FIG. 6.

FIG. 7 shows a flowchart 700 of an exemplary implementation of the retrieving step 320. The left-hand sight of the flowchart 700 relates to an offline operation of the web content background function 414. The right-hand sight of the flowchart 700 relates to an online operation of the web content background function 414. The web content background function 414 can be implemented for exclusive offline operation or exclusive online operation. Alternatively, the web content background function 414 can be implemented for offline and online operation depending on a network configuration or the availability of certain web servers 232 via the Internet 230.

The web content background function 414 allows continuously analyzing the content of only the web pages actually visited by the mobile subscribers 240 of the telecommunications network 220, as opposed to a conventional search engine crawling all pages of the web to find keywords and/or to categorize them. The web content background function 414 is used, in an advanced implementation, to provide keywords and categories as input parameters to the CIM.

The operation of the web content background function 414 is triggered by the reception of one or more URLs 602 from the URL subscriber database 504. For example, the URL subscriber database 504 periodically sends the list 602 of recently added or updated URLs to the web content background function 414.

If only the HTTP header is stored by the passive probe 407, the operation starts at reference sign 702. The offline operation allows actively fetching the URL content at a later time by the web content background function 414. The web content background function 414 assesses whether or not the received URL already exists in the URL content database 608 in a step 704. If there is already an entry in the URL content database 608, the corresponding received URL is discarded in the step 706.

Otherwise, an HTTP request 604 for the content of the URL is transmitted towards the Internet 230 in a step 708.

If the passive probe 407 collects the URL content of a web page as the subscriber 240 is downloading it, the operation of the web content background function 414 starts at reference sign 710. In a step 712, the web content background function 414 assesses whether or not the received URL already exists in the URL content database 608. If the URL content database 608 includes an entry for the received URL, the received URL is discarded in a step 714.

Independent of the online or offline operation, the web content background function 414 performs a categorization and/or keyword algorithm on the received content 606 to generate a list of content keywords and/or content categories in a step 716. The received URL and the associated categories ($C_1$, $C_2$, ... ) and/or the generated keywords ($K_1$, $K_2$, ... ) are inserted into the URL content database 608 in a step 718.

The web ground background function is then stopped in a step 720 until the reception of a further list 602 triggers the operations 700.

Exemplary data structures for implementing the databases 502, 504 and 506 are described. These data structures can support, e.g., the CIM and/or reduce a time of response at the access interface 218 for Internet usage analysis. The storing unit 216 stores a number of data structures, which may be based on the web usage data coming from the passive probe 407. The exemplified data structures can be implemented in any sub-combination and additional databases beyond the databases 502, 504, 506 and 608 can be included in the storing unit 216.

Furthermore, while tables are used for describing the data structures herein, the data structures do not have to be stored in a specific type of format. Tables can be used in the case of relational databases or more flexible data structures in the case of no-SQL storing units 216. Moreover, the storing unit 216 can be implemented by means of a Distributed File System (DFS).

The subscriber URL database 502 holds information about the web visits of a group of mobile subscribers 240 or of each mobile subscriber 240. The subscriber URL database 502 forms a basis for all web usage mining. Certain attributes of the mobile subscribers 240 and/or the visits are stored in combination with the URL of the visited website.

A reduced implementation of the subscriber URL database 502 stores the unique subscriber identity, the URL of the visited website and a time of the web request. In advanced implementations of the subscriber URL database 502, additional information is stored for a more detailed web usage mining at a later stage. For example, the HTTP status response, a number of bytes transferred, a client application (also referred to as agent) used by the mobile subscriber 240, and operating system of the mobile subscriber 240 and/or an URL of a referring server are stored.

The URL subscriber database 504 is constructed based on the subscriber URL database 502. The URL subscriber database 504 is configured to enable faster queries on the URL level. For example, the list 602 of URLs can be rapidly derived due to the entry structure of the URL subscriber database 504.

The referral database 506 indicates, for each URL, from which referring server 232 the mobile subscriber 240 is being referred to that URL. The referrer server (which is included in the second column in the exemplary implementation of the referral database 506 shown in FIG. 5) is based on information included in the HTTP referrer field in the HTTP request. The HTTP referrer field is a HTTP header field that identifies the address of the web page that linked to the resource being requested. By checking the referrer server, the server 232 is informed of the web page from which the request originates. This data is useful for determining web pages from which a visitor is attracted. The referrer server indicated in the referral database 506 thus allows distinguishing between direct access (without a referring web page), search engines (e.g., providing a list of search results, each of which includes a referral) and/or a referral from a social media.

A statistical analysis performed by the CIM is described. The CIM includes a number of analytics components performing, e.g., web mining functions. In the implementation described herein, the web mining functions are focused on competitor analysis by using web access data from multiple sites, as opposed to an analysis based on log files of web servers hosting the own website of a company. All analytics components expose APIs at the access interface 218. The access interface 218 can be used by a person or program collectively referred to as an agent 270, as is schematically illustrated in FIGS. 2 and 8.

Figure 8:
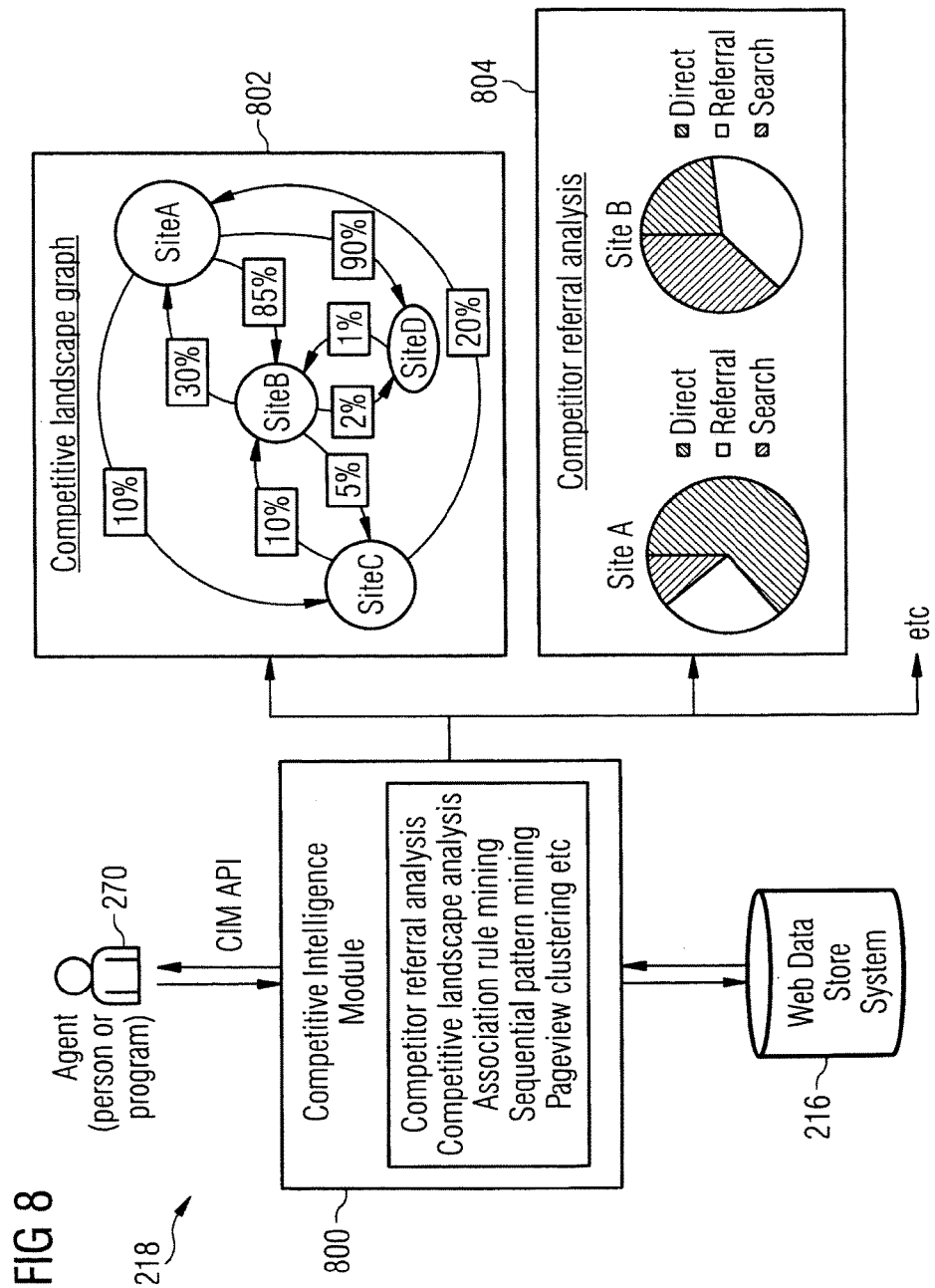
FIG. 8 schematically illustrates details of a fourth implementation of the device of FIG. 2 combinable with the implementations of FIGS. 4 to 6.

Each API exposed by the CIM shown at reference sign 800 in FIG. 8 can be accessed by the agent 270. The CIM 800 accesses processed web data, which is stored in the storing unit 216 including one or more of the databases 502, 504, 506 and 608, which is also referred to as a web data store system (WDSS). Entries in the storing unit 216 are continuously generated or updated by the web mining background functions 412 and/or 414 based on the web traffic 402 at the interface 222.

Based on the data available in the storing unit 216 and algorithms in the CIM 800, CIM 800 computes and returns via the access interface 218 CI information to the agent 270, as requested through the CIM API.

FIG. 8 shows an overview of the CIM 800, including its analytics components, interactions with the agent 270 through the CIM API, interactions with the storing unit 216 to request and receive the data needed for the analysis and exemplary CI information types 802 and 804 output by the CIM 800.

Figure 9:
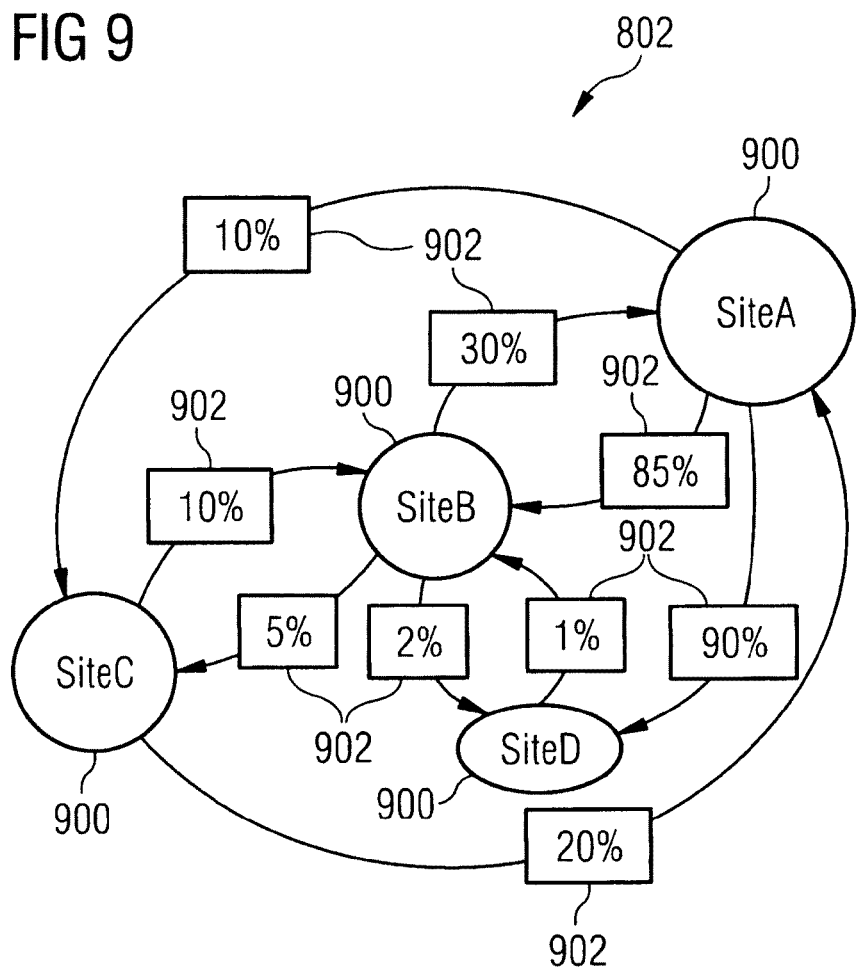
FIG. 9 schematically illustrates a first type of information derived from the data traffic using the implementation of FIG. 8.

FIG. 9 schematically illustrates CI information 802 provided by a competitive landscape analysis component of the CIM 800. The competitive landscape analysis provides a fully automated analysis of the competitive landscape centered around a particular keyword, category, subject, technical field or business area, e.g., based on the web usage behavior in the telecommunications network 220.

The competitive landscape analysis component receives as input a set of URLs to analyze. The output of the competitive landscape analysis component is a graph 802. Nodes 900 correspond to the analyzed URLs. Edges 902 of the graph 802 are modeled using the number or percentage of common mobile subscribers 240 to both nodes 900 linked by the corresponding edge 902.

The exemplary graph 802 shown in FIG. 9 includes the sites A to D (collectively indicated by reference sign 900). The sites 900 are listed as URLs in the API request from the agent 270. The request specifies an analysis for directed edges based on a percentage of common users. The graph 802 can be interpreted as "of all the mobile subscribers 240 that have accessed site B, 30% of them also accessed site A", etc.

The API request further includes input parameters for the competitive landscape analysis component. In a reduced implementation of the component, a list of URLs to analyze and the graph-type of output is included in the input parameters. For example, a third-party company as the agent 270 knows exactly its competition and the corresponding websites. In practice, the absolute number of visitors would also matter as well as the percentage of each competitor, which indicates the market share.

In an advanced implementation of the competitive landscape analysis component, a set of keywords or categories is received via the API. Based on the keywords or categories, the component automatically finds URLs that match the keywords or categories. The match is performed by the CIM 800 either by directly querying the pre-stored URL content database 608 to find the keyword or category (e.g., in the second or third column) to identify the corresponding URL (e.g., in the first column). Alternatively, or in combination, the CIM 800 performs the match using an integrated active keyword search function and/or an integrated active category search function. The integrated function uses existing search engines for the Internet 230 (e.g., Google, Bing, Yahoo, etc.) to perform active searches for the provided keywords or categories. The search result provided by the search engines is used by the CIM 800 to populate a list of URLs defining the nodes 900 for the competitive landscape analysis component. An implementation of the component using keywords or categories as its input is useful for an agent 270 that does not have a good understanding about its competitive landscape, e.g., an agent that would like to use the API of the CIM 800 to determine its competitive landscape based on view keywords or categories corresponding to its products or services.

Figure 10:
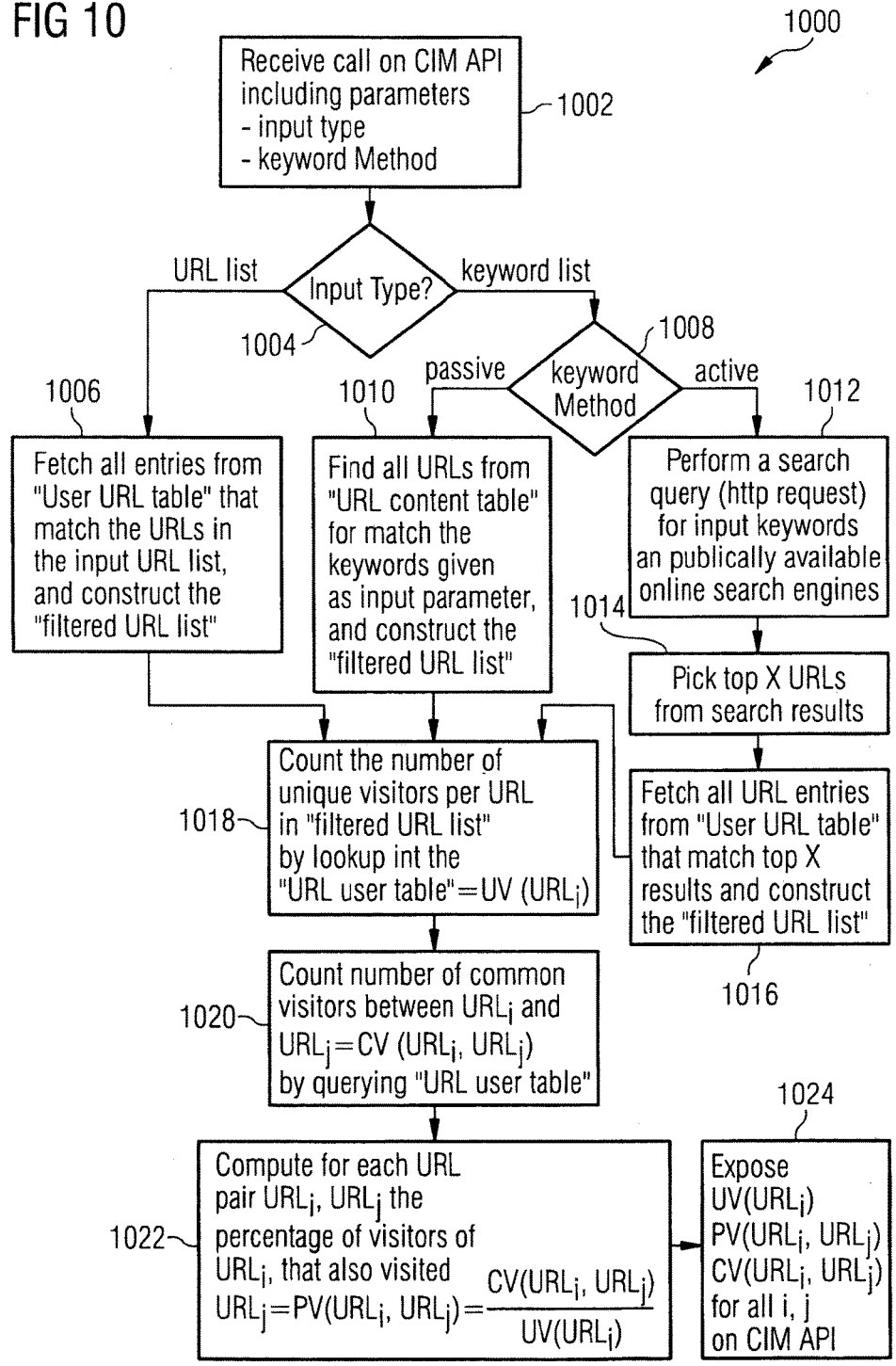
FIG. 10 shows a flowchart for deriving the information of FIG. 8.

FIG. 10 shows a flowchart 1000 for operating the CIM 800 related competitive landscape analysis component. The flowchart 1000 provides details for the signaling flow in the CIM 800 depending on the input parameters. The competitive landscape analysis component synergistically integrates the determination of relevant URLs selected from all the visited URLs in the mobile telecommunications network 220 (e.g., generating the "filtered URL list" based on the input parameters) and in computing relevant measures 902 for the set 900 of determined URLs, e.g., in order to obtain relevant competitive landscape information to the entity using the API 218.

In a step 1002, a call from the agent 270 is received on the CIM API. The call includes the input parameters input and keyword method. In a step 1004, the input type is analyzed. For an input type including an URL list, all entries from the subscriber URL database 502 are fetched that match the URLs in the input URL list (which is also referred to as the filtered URL list) in a step 1006.

If the input type includes a keyword list, a step 1008 reads the input parameter keyword method. If the keyword method is passive, all URLs from the URL content database 608 that match the keywords or categories given as input parameter (also referred to as filtered URL list) are determined in a step 1010).

If the keyword method is active, a search query (e.g., by means of an HTTP request) is performed for the input keywords or categories on publically available online search engines in a step 1012. The first X proposals in the search result, e.g., the first X URLs having the highest rank, are selected in a step 114. In a step 1016, all URL entries from the subscriber URL database 608 that match the selected URLs (also referred to as the filtered URL list) are determined.

Independent of the input type and way of generating the URL list, the CIM 800 counts the number of unique visitors for each URL included in the filtered URL list by looking up the URL in the URL subscriber database 504 in a step 1018. Furthermore, the number of common visitors between a $URL_i$ and a $URL_j$, which is denoted by CV ($URL_i$, $URL_j$), is determined by querying the URL user database 504 in a step 1020. For each pair of $URL_i$ and $URL_j$, the percentage of visitors of $URL_i$ that also visited $URL_j$ is computed or according to $$PV(URL_i, URL_j) = CV(URL_i, URL_j)/UV(URL_i)$$

in a step 1022. The computed values UV, PV and CV are exposed via the CIM API 218 for all URL pairs (i,j) in a step 1024.

A competition referral analysis component, which can be implemented alternatively or in addition to the competitive landscape analysis component, is described with reference to FIG. 11. The competition referral analysis component provides the type of output 804 graphically represented in FIG. 11. The competition referral analysis component extracts data from the referral database 506.

Conventionally, a website owner can analyze which domains and web pages are referring traffic to its own website. The referral analysis achievable by the technique presented herein is not limited to referrals to a website that is owned by or otherwise directly accessible to the agent 270. The competition referral analysis component of the CIM 800 statistically analyses referrals to, e.g., websites of suppliers or competitors.

The competition referral analysis component receives, e.g. via the access interface 218 from the agent 270, a list of URLs for which the referrals are to be analyzed. The competition referral analysis component provides for each of the received URLs a diagram 1100 or data underlying the diagram 1100, e.g. via the access interface 218 to the agent 270. The diagram 1100 provides a breakdown of referrers for the different sites.

Figure 11:
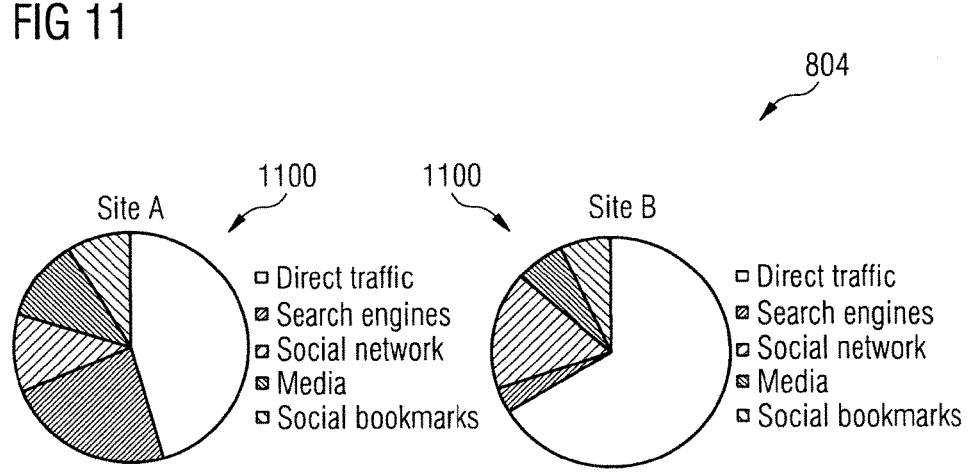
FIG. 11 schematically illustrates a second type of information derived from the data traffic using the implementation of FIG. 8.

In the exemplary output 804 shown in FIG. 11, a referrer breakdown for the website A and website B is schematically illustrated. The websites A and B can be a subset or all of the websites 900 also analyzed in the transition analysis 802. The owner of, e.g., site A may wish to compare the referral structure of its website A with the competing website B, e.g., if there are large sources of data traffic 402 in a technical field or service area to which both sites A and B relate and that are, partially or completely, not attracted by the website A. The breakdown provided by the competition referral analysis component differentiates between direct traffic, referrals from search engines, referrals from social networks, referrals from media and social bookmarks.

Alternatively or in addition to the two exemplary analysis components described above for the CIM 800, the CIM 800 may include other web usage mining components based on web accesses data related to a plurality of different websites, e.g., for analyzing load balancing and/or constructing CI information valuable to third party companies. Any other known web usage mining component could be implemented based on the derived information, e.g., by accessing one or more of the data structures 502 to 506 and 608. Implementations of the technique may thus provide information that extends the conventional single-website approach based on log files of a local web server 232 to a multiple-website approach, e.g., as exemplified for the two analysis components described above.

Two use-cases are described with reference to FIGS. 12 and 13. The use-cases relate to a third party company accessing the CIM API via the providing unit 218 to obtain CI information about its area of productivity or service provision. The use-cases are based on a real analysis of data traffic 402 at a telecommunications network 220 of a mobile operator.

Figure 12:
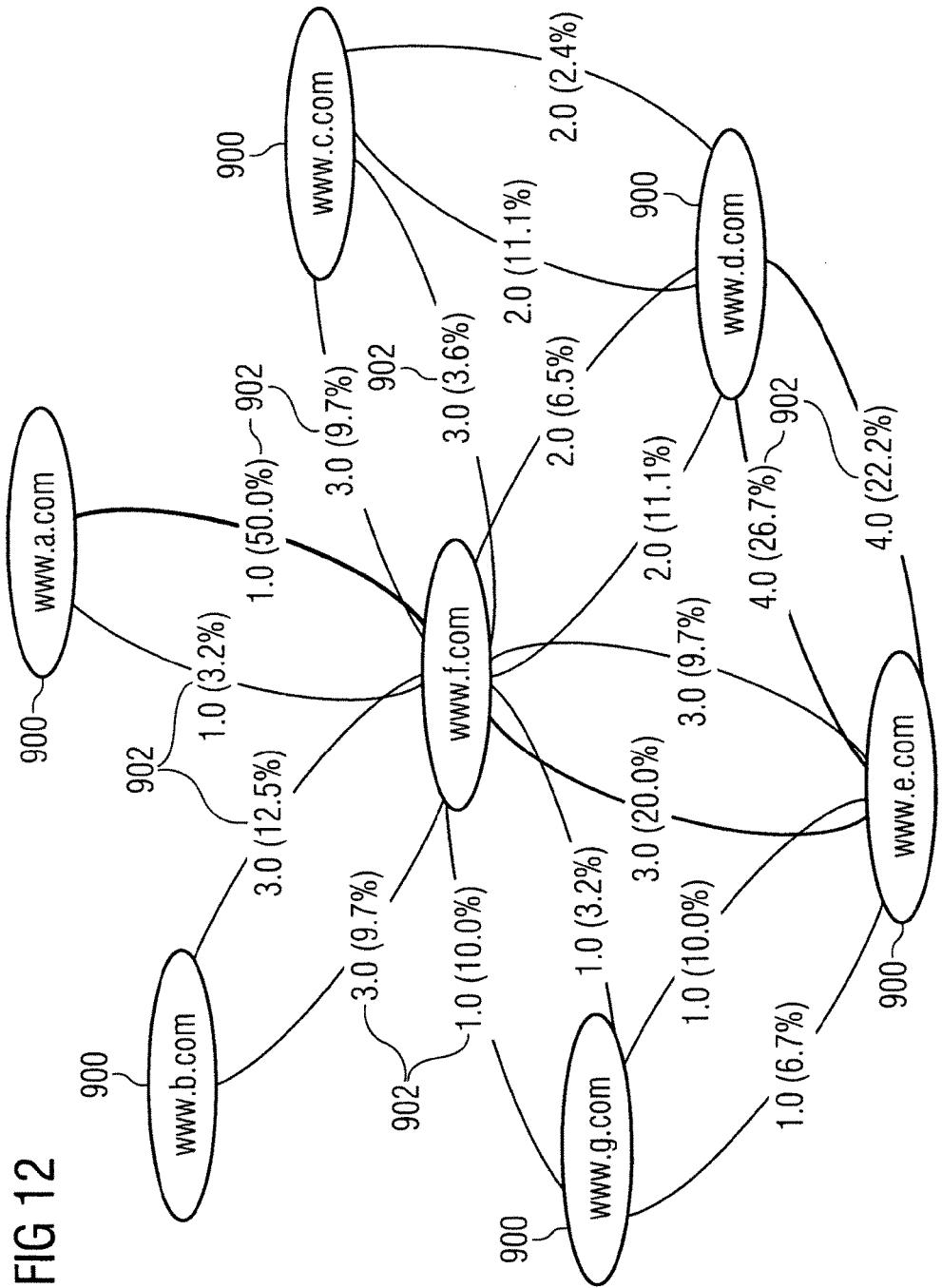
FIG. 12 schematically illustrates a first example combining the types of information illustrated in FIGS. 9 and 11.

The scenario of the first use-case described with reference to FIG. 12 is centered on a company that provides a website for selling flight tickets and that would like to better understand its competition situation, specifically the competitive landscape graph 802 and the referral analysis 804 of competing websites. Initially, the agent 270 has no knowledge about all the competitors in the relevant field. Thus, the analysis initially provides a list of relevant websites through the CIM API.

The flight ticket company submits a request to the API function of the device 210, requesting the competitive landscape analysis 802 and the competition referral analysis 804. As input, the request includes its own website URL and the keyword "flight tickets".

The CIM 800 first performs a lookup on the provided keyword towards its URL content table 608, in order to retrieve the set of URLs that match the keyword.

Additionally, if such a parameter is set to true in the API request, the CIM 800 performs active searches for the keyword at one or several available search engines. The X best-matching (e.g., the first X) URLs resulting from the search request are added to the list of URLs to analyze.

After the URL content table lookup and the search engine keyword-search, the URL list to be analyzed includes the URLs shown in FIG. 12.

The resulting competition landscape graph for the URLs is shown in FIG. 12. The exemplary graph in FIG. 12 relates to a competition landscape for traveling companies in Finland. The nodes 900 represent the web pages (or collectively, the websites) of the requesting company 270 and its competitors. Each of the edges 902 from a company A to a company B has a weight that is proportional to the number (e.g., the percentage) of common users.

The competition landscape graph 802 reveals, e.g., that there are no common users between www.a.com and www.b.com, and no common users between www.b.com and www.c.com. Moreover, the site www.f.com has more incoming arrows, which indicates that the corresponding company attracts more customers from its competitors than vice versa.

In the use-case described with reference to FIG. 13, a newspaper has an online portal and would like to access the competitive landscape graph 802 in order to understand how its readers are reading other newspapers, how the readers of other newspapers are also reading its newspaper, etc.

Figure 13:
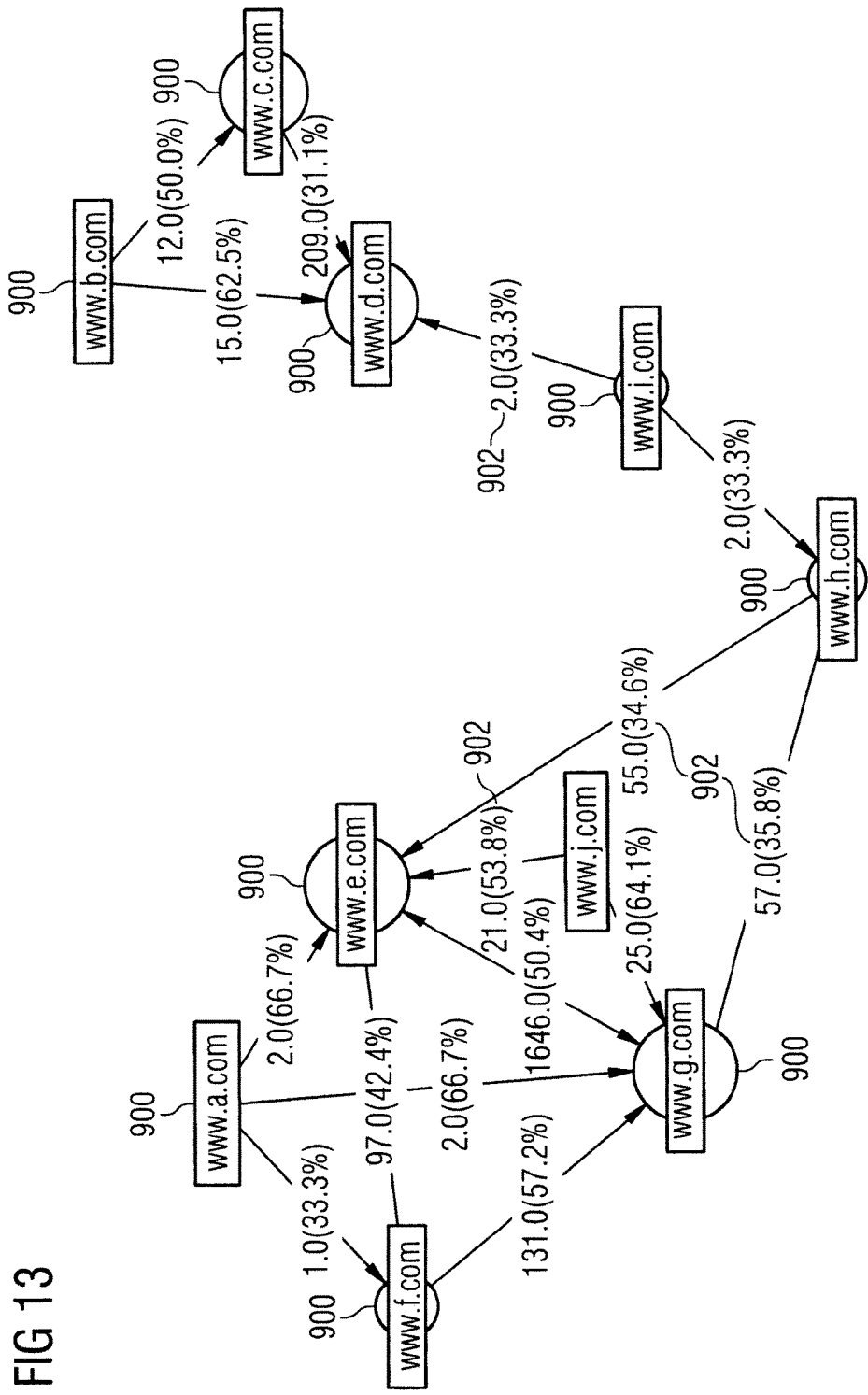
FIG. 13 schematically illustrates a second example combining the types of information illustrated in FIGS. 9 and 11.

Using the technique disclosed herein, the URLs, which are associated to the main newspapers within a common market (e.g., the newspaper market in Finland), are used to derive the graph of FIG. 13.

The exemplary graph shown in FIG. 13 numerically represents the competition landscape for newspaper in Finland. The nodes 900 represent web pages of the requesting newspaper and its competitors. The edges 902 from a company A to company B include a weight proportional to the number (e.g., the percentage) of common readers.

A location analysis component, implementable in any sub-combination with the aforementioned components, uses a location or a path of the mobile subscribers 240, e.g., for correlating visited web pages based on common locations and/or paths. For each entry in the subscriber-URL database 502, the location of the mobile subscriber 240 when visiting that URL is included. The location is based on cell-level information, e.g., GSM, UMTS or LTE cells of the telecommunications network 220.

Alternatively or in addition, the location information is based on a GPS position, if available and reported by the UE of the subscriber 240 or a positioning algorithm implemented by an operator of the telecommunications network 220. By including the location information for each page visit, additional CI information is provided about where users typically are when they visit certain web pages. As a simplified example, a particular website A is very popular in Stockholm, whereas a competition website B is only popular in Gothenburg.

A subscriber profiling analysis component, implementable in any sub-combination with the aforementioned components, uses a subscriber profile. The telecommunications network 220 provides the profile of the subscriber 240 that visits the websites 900. The subscriber profiling analysis component combines the profile with the derived information. The combined information is provided via the API 218. The profile includes, e.g., age, address, phone model, subscription type, web browsing behavior and/or call pattern. In an advanced implementation of the device 210, the API 218 provides structured information, such as: web page X is typically visited by women of 20-25 years with iPhones, and web page Y is typically visited by men of 50-60 years and frequently calling to abroad destinations.

The device may further include a link analysis component. Data packets originating from an Internet source and directed towards the telecommunications network are analyzed by the link analysis component as to links included therein. URLs of the links are stored in association with the Internet source and the mobile subscriber in a potential referral database. For example, the Internet source is a search engine and the analyzed data packets include a search thresult. Since the links included in the search result are viewed by the mobile subscriber, the absence of a subsequent data packet from the mobile subscriber towards the Internet and including an HTTP request for the stored URL is stored as a dismissal of the URL (e.g., as a decision of the mobile subscriber against the URL). The presence of a subsequent data packet from the mobile subscriber towards the Internet and including a HTTP request for the stored URL is stored as a selection of the URL by the mobile subscriber. URLs selected by the same mobile subscriber are stored in association. The CIM API provides, upon a request including one or more of the URLs stored in association, one or more further URLs also stored in the same association. Optionally, the CIM API provides a black list of URLs that were viewed by the mobile subscriber underlying the association and dismissed.

Some implementations of the technique derive Competitive Intelligence information, e.g., any information referring to the process of gathering and analyzing information about products, domain constituents, customers and competitors for the short term and long term planning needs of an organization, as published in "Competitive Intelligence and Web Mining: Domain Specific Web Spiders", by K. M. Salama, CSCE 590, Seminar Report.

The derived information is optionally combined with published company reports and other printed or online information. The CI information may include Competitor Profiling such as background, finance, marketing, personnel; market products, product features and performance; new accounts, proposals, contracts and financial incidents; customer preferences and opinions; new technologies, R&D and patents. Sources for the additional information include websites of suppliers, competitors and customers; news websites; data providers; community articles and blogs; and social networks.

As has become apparent from above description of exemplary embodiments, the technique proposed herein provides a technical solution for mobile telecommunications service providers to derive, analyze and provide web usage data available in the network. The usage data can be based, e.g., on correlations between URLs without disclosing any personal data. For example, the mobile subscribers are merely used as a link between visits of different URLs. This link can be used for computing a correlation or a transition probability between different URLs without disclosing the linking subscribers.

The telecommunications network provider can beneficially implement the technique, because the telecommunications network observes all the web traffic going through the network and is not limited to traffic towards one or few (e.g., owned) accessible web server (e.g., in the case of web server log files). The technique is also not limited to an unspecific analysis of all URLs (e.g., in the case of search engines categorizing and crawling large portions of the entire web). The technique is also not biased by a web usage analysis through specific web browsers (e.g., in the case of reporting web browsers).

Technically, the provided solution can rely on a passive probe of web usage data, which provides more inside than data collected from web crawlers or robots, since it provides information about the usage behavior and not only about content or structure of the web. Basing a CI analysis on the web usage data and complementing the static web content and static web structure date provides a more comprehensive view on websites competing for the same users or a similar group of users.

Implementations of the technique may analyze and derive the most popular products within the company's portfolio (e.g., specified by a company name at the access interface), the products users searched and bought, the products users searched and did not buy, the clickstream of groups of users, etc. Implementations of the technique may analyze and derive, e.g., for a newspaper marketing team, the most accessed news or groups of news accessed by the same subscribers. Implementations of the technique may analyze and derive, e.g., for retail online stores, input to a recommendation system, e.g., in order to improve customer retention and more personalized services.

Implementations of the technique may analyze and derive CI information about competitors obtained from the web and web usage. At least some of the implementations derive information from the interaction of customers, or potential customers with competing providers. The technique can be implemented to objectively determine popularity and/or success of a product X of a company Y, which products and/or which entities are competing, how a certain website attracts its visitors, and which products and/or customers are or will become interested in a certain class of topics, products or services.

In sum, at least some implementations of the technique provide information about web usage, which is not easily available from other sources. The derived information can be relevant, e.g., for comparing competing products or services. User identification, which can be problematic for conventional web server log file analysis, is achieved by collecting the web usage information at the telecommunications network interface, so that the technique has access to the mapping between static subscriber identity and the dynamic IP addresses assigned to the subscribers. The clear user identification can significantly contribute to the quality of web usage mining. The information derived from the analyzed data packets may be stored in each case in association with one of the subscriber identities retrieved for those data packets from which the information is derived.

Applications based on web usage mining can be implemented based on the technique to determine a life-time value of clients, to design cross-marketing strategies across products and services, to evaluate effectiveness of promotional campaigns, to optimize the functionality of web-based applications, to provide more personalized content to visitors, and to determine a more effective, logical and/or intuitive structure for a website.

It will be appreciated by those skilled in the art that the embodiments described above may be adapted or extended in various ways. Accordingly, the scope of the invention is defined only by the claims that follow the elements recited therein.

The invention claimed is:

1. A method of providing information derived from data traffic between a telecommunications network and the Internet, the telecommunications network providing mobile Internet access to a plurality of mobile subscribers using Internet Protocol, IP, addresses allocated to the mobile subscribers, the method comprising:
   analyzing, in data traffic at an interface between the telecommunications network and the Internet, data packets each of which includes an IP address;
   retrieving, for the analyzed data packets, a subscriber identity based on the IP address included in a data packet allocated by an allocation function of the telecommunications network, the allocation function allocating to each subscriber identity of the plurality of mobile subscribers an IP address in the telecommunication network;
   storing information derived from the analyzed data packets in combination with the retrieved subscriber identities, wherein the information derived for each of the analyzed data packets includes a Uniform Resource Locator, URL, for the Internet;
   computing correlations for combinations of two or more different URLs, each correlation being computed for one of the combinations based on a first number of subscriber identities, wherein each of the subscriber identities stored in combination with each of the two or more URLs of the one combination contributes to the first number; and
   providing an access interface for accessing the stored information.

2. The method of claim 1, wherein the derived information is stored further in combination with information as to a current location of the mobile subscriber.

3. The method of claim 1, wherein each correlation is normalized by a second number of subscriber identities, wherein each of the subscriber identities stored in combination with at least one of the two or more URLs of the corresponding combination contributes to the second number.

4. The method of claim 1, further comprising
   computing transition probabilities for pairs of first and second URLs, each transition probability being computed for a transition from the first URL to the second URL of one of the pairs based on a third number of subscriber identities divided by a fourth number of subscriber identities, wherein each of the subscriber identities stored at least once in combination with the first URL of the one pair and at least once in combination with the second URL of the one pair contributes to the third number, and wherein each of the subscriber identities stored at least once in combination with the first URL of the one pair contributes to the fourth number.

5. The method of claim 1, further comprising
   receiving a descriptor for specifying a set of URLs via the access interface,
   wherein at least one of the correlations and transition probabilities are computed for the set of URLs specified by the descriptor and provided via the access interface.

6. The method of claim 1, wherein data packets originating from an Internet source and directed towards the telecommunications network are analyzed, the method further comprising:
   storing the URL in association with the Internet source in a potential referral database.

7. The method of claim 1, wherein data packets directed towards the Internet and including a Hypertext Transfer Protocol, HTTP, request are analyzed, wherein the HTTP request includes the URL, and wherein the URL is stored in association with the subscriber identity in a subscriber-URL database, entries in the subscriber-URL database including one subscriber identify and one URL.

8. The method of claim 7, wherein entries in the subscriber-URL database further include a time stamp indicative of at least one of a time of submitting the HTTP request at the mobile subscriber and a time of analyzing the data packet at the interface.

9. The method of claim 7, wherein the subscriber identity is stored in association with the URL in a URL-subscriber database, entries in the URL-subscriber database including one URL and at least one subscriber identity, and the entries in the URL-subscriber database are subdivided into consecutive time intervals, each of the entries corresponding to one time interval of the consecutive time intervals.

10. The method of claim 9, further comprising:
    obtaining content referenced by the URL; and
    storing information derived from the obtained content in association with the URL in a URL-content database,
    wherein the step of obtaining is triggered by a change in the URL-subscriber database.

11. The method of claim 10, wherein the content is obtained from the Internet in a HTTP response to a second HTTP request, which is different from the HTTP request included in the analyzed data packet.

12. The method of claim 10, further comprising:
    caching content in an HTTP response in the data traffic at the interface from the Internet towards the telecommunications network in a cache in association with the URL included in the HTTP request of the analyzed data packet, wherein the HTTP response is related to the HTTP request by the URL or a session ID further included in the HTTP request and the HTTP response, and wherein the content referenced by the URL in the URL-subscriber database is obtained from the cache.

13. The method of claim 10, wherein entries in the URL-subscriber database further include a counter indicative of a number of the analyzed data packets including the corresponding URL, wherein the step of obtaining the content is triggered for a plurality of entries in the URL-subscriber database in an order defined by the counter.

14. The method of claim 10, further comprising:
extracting keywords from the content and determining a category in a predefined hierarchical taxonomy,
wherein the derived information includes the extracted keywords and the determined category stored in association with the URL in the URL-content database.

15. The method of claim 7, further comprising:
storing the URL in a referral database in association with an HTTP referrer, if the HTTP request further includes the HTTP referrer in a header field of the analyzed data packet, and otherwise storing the URL in the referral database in association with an indicator indicating the absence of the HTTP referrer.

16. The method of claim 15, wherein each entry in the referral database includes the URL in association with the HTTP referrer or the indicator and further includes a counter, which is incremented for each analyzed data packet corresponding to the association.

17. The method of claim 1, wherein the mobile subscribers place calls to areas and/or receive calls from areas, and the data traffic at least partially includes the calls, and wherein the derived information is stored further in combination with the areas of calls of the subscriber identity.

18. The method of claim 1, wherein the subscriber identity includes a hash value derived from personally identifiable information, wherein the personally identifiable information is not included and/or not derivable from the subscriber identity.

19. A computer program product comprising a non-transitory computer readable storage medium storing program code that when executed by a computing device causes the computing device to perform the following operations comprising:
providing information derived from data traffic between a telecommunications network and the Internet, the telecommunications network providing mobile Internet access to a plurality of mobile subscribers using Internet Protocol, IP, addresses allocated to the mobile subscribers, the method comprising:
analyzing, in data traffic at an interface between the telecommunications network and the Internet, data packets each of which including an IP address;
retrieving, for the analyzed data packets, a subscriber identity based on the IP address included in a data packet allocated by an allocation function of the telecommunications network, the allocation function allocating to each subscriber identity of the plurality of mobile subscribers an IP address in the telecommunication network;
storing information derived from the analyzed data packets in combination with the retrieved subscriber identities, wherein the information derived for each of the analyzed data packets includes a Uniform Resource Locator, URL, for the Internet;

computing correlations for combinations of two or more different URLs, each correlation being computed for one of the combinations based on a first number of subscriber identities, wherein each of the subscriber identities stored in combination with each of the two or more URLs of the one combination contributes to the first number; and
providing an access interface for accessing the stored information.

20. A device providing information derived from data traffic between a telecommunications network and the Internet, the telecommunications network providing mobile Internet access to a plurality of mobile subscribers using Internet Protocol, IP, addresses allocated to the mobile subscribers, the device comprising:
a processor; and
a memory coupled to the processor and containing program code that when executed by the processor causes the process to perform the following operations comprising:
analyzing, in data traffic at an interface between the telecommunications network and the Internet, data packets each of which including an IP address;
retrieving, for the analyzed data packets, a subscriber identity based on the IP address included in a data packet allocated by an allocation function of the telecommunications network, the allocation function allocating to each subscriber identity of the plurality of mobile subscribers an IP address in the telecommunication network;
storing information derived from the analyzed data packets in combination with the retrieved subscriber identities, wherein the information derived for each of the analyzed data packets includes a Uniform Resource Locator, URL, for the Internet;
computing correlations for combinations of two or more different URLs, each correlation being computed for one of the combinations based on a first number of subscriber identities, wherein each of the subscriber identities stored in combination with each of the two or more URLs of the one combination contributes to the first number; and
providing an access interface for accessing the stored information.

21. The device of claim 20, wherein the information derived for each of the analyzed data packets includes a Uniform Resource Locator, URL, for the Internet.

22. The device of claim 21, the operations further comprising:
computing transition probabilities for pairs of first and second URLs, each transition probability being computed for a transition from the first URL to the second URL of one of the pairs based on a third number of subscriber identities divided by a fourth number of subscriber identities, wherein each of the subscriber identities stored at least once in combination with the first URL of the one pair and at least once in combination with the second URL of the one pair contributes to the third number, and wherein each of the subscriber identities stored at least once in combination with the first URL of the one pair contributes to the fourth number.

* * * * *